3,029,230
PROPANE TELOMERIZED ETHYLENE-VINYL ACETATE COPOLYMER
Howard William Strauss, Groves, Tex., assignor to E. I. du Pont de Nemours and Company, Wilmington, Del., a corporation of Delaware
No Drawing. Filed June 17, 1959, Ser. No. 820,844
6 Claims. (Cl. 260—87.3)

The present invention relates to improved polyethylene resins, and, more particularly, to improved polyethylene resins obtained by the copolymerization of ethylene with specific vinyl monomers.

High molecular weight polyethylene suitable as a plastic was first discovered by Fawcett et al. and is claimed in U.S. Patent 2,153,553 issued on April 11, 1939. The product is obtained by an oxygen-catalyzed, free radical polymerization of ethylene at elevated temperatures and high pressures. The process and various known modifications thereof, in general, give rise to a polymer having a density of about 0.91 to 0.93 g./cc., and a melting point of about 110 to 120° C. The polymer is partially crystalline and chemically comprises a straight chain ($-CH_2-CH_2-$)$_n$ hydrocarbon molecule having a certain number of hydrocarbon side chains which, depending on the number of carbon atoms in the chain, are referred to as either short chain branching or long chain branching. The polymer is further characterized by a certain amount of unsaturation which may be vinyl, trans or vinylidene in nature. The branching of the polymer in combination with molecular weight significantly affects, if not determines, many of the physical properties of the polymer. Thus, short chain branching greatly affects the solid state properties of the polymer, such as crystallinity, density, stiffness, yield point and melting point, and thereby determines the utility of the polymer in commercial applications. Polyethylene is widely used in the fabrication of molded and extruded articles, such as squeeze bottles and pipes, as a coating on such substrates as paper, as insulation on wire, and as a film for packaging. It is reasonable that a polymer of such wide utility, although suitable, could be greatly improved in specific applications. Thus, as a packaging film candidate polyethylene has many desirable characteristics, such as chemical stability, low moisture permeability, non-toxicity, ease of preparing, packaging and sealing, toughness and flexibility; however, polyethylene is inferior in optical properties as compared to competitive materials, such as cellophane.

It is therefore an object of the present invention to provide improved polyethylene film resins. Another object of the present invention is to provide modified polyethylene resins which have improved optical properties and yet substantially retain their strength and toughness and ease of fabrication. Other objects will become apparent hereinafter.

The objects of the present invention are accomplished by a copolymer of ethylene and a vinyl ester, preferably vinyl acetate, said vinyl ester being copolymerized with the ethylene to an extent of 0.5 to 3 mol percent of the total composition, said copolymer having a density of 0.915 to 0.940 g./cc., and a melt index of 0.1 to 20. In accordance with the present invention, it was found that copolymers of ethylene and vinyl acetate or similar vinyl esters, containing the vinyl comonomer in the range stated, result in ethylene polymers having greatly improved optical properties on extrusion into thin films suitable for packaging. It was found that the desirable film properties of straight polyethylene are substantially retained in the copolymer when the quantity of comonomer in the copolymer is maintained in the range stated hereinabove. Although it was known heretofore that ethylene could be copolymerized with vinyl acetate, the resulting copolymers all contained substantially higher concentrations of the vinyl monomer in the copolymer, and, consequently, differed in properties and structure from the copolymers of the present invention. Copolymers containing higher concentrations of vinyl acetate are too low in molecular weight, due to the telomerizing effect that the comonomer has on the polymerization, and too low in crystallinity, due to the interfering effect of the ester groups on the crystallization of the polymer, to be suitable for packaging film. Thus, as the vinyl acetate comonomer concentration in the copolymer is increased, the copolymer becomes deficient in toughness, strength and permeability, and in the molten stage is so soft and tacky that it can not be satisfactorily used in the melt extrusion of film. Furthermore, no advantage in optical properties is observed in film fabricated from copolymers of ethylene containing higher vinyl comonomer concentration. The concentration of the vinyl comonomer in the copolymer is accurately measured by saponification of the ester group of the comonomer after copolymerization.

The copolymers of the present invention are further characterized by their melt index and their density. The term "melt index" is a measurement of rate of molten plastic in grams per 10 minutes as is obtained through an orifice of 0.0825 in. in diameter and 0.315 in. long at 190° C. under a pressure of 43.1 lbs. The method is more fully described in ASTM D–1238–52T. Melt index is a relative inverse measurement of molecular weight which at the same time gives an indication of the fabricability of the polymer by melt extrusion techniques. For film resins it is, in general, necessary to maintain the melt index between 0.1 and 20. At lower melt indexes the molecular weight is too high to make the resin suitable for rapid and smooth extrusion; at melt indexes above 20, the resin is too low in molecular weight and will result in a film deficient in solid state properties, such as toughness and stiffness, and, furthermore, is low in melt strength making fabrication difficult. A second measurement which characterizes the polymer of the present invention is its density. The density of the polymer is determined on an annealed sample, molded at a temperature of 180° C., cooled in the press, and then annealed for one hour in boiling water. The copolymers of the present invention have densities in the range of 0.915 to 0.94 g./cc. At lower densities the copolymers have insufficient crystallinity to be suitable for manufacture into films.

It is believed that these three properties characterize the copolymers of the present invention. Thus, melt index defines the molecular weight of the copolymer which, to a certain degree, controls the solid state properties of the polymer, such as toughness, and also greatly affects the rheological properties of the polymer at temperatures above the melting point; density is a rough measure of chain branching which determines crystallinity, melting point, yield strength and permeability, generally referred to as density dependent properties, and comonomer concentration which gives rise to the outstanding optical properties of the present invention. If it is desirable, the normal short chain branching of the polymer may be measured by techniques described in the Journal of the Am. Chem. Soc., volume 75, p. 6113 (1953).

It was found that the comonomers employed in the formation of the film resins of the present invention are unique in their behavior of improving the optical properties of polyethylene resins. Other vinyl monomers, such as butene-1, methyl methacrylate and styrene, do not give rise to the improvement in properties obtained with the copolymers of the present invention. The reason for the unique behavior of the vinyl comonomer employed in the present invention is believed to be due to the configuration of the side chain and the relative polymerization reactivity of the monomers leading to random copolymers in the case of vinyl esters such as vinyl acetate.

The novel copolymers of the present invention are prepared by a free radical initiated polymerization carried out at pressures of 15,000 to 25,000 p.s.i.g. and temperatures of 150 to 250° C. at an ethylene conversion greater than 6%. The process may be carried out in the presence of a diluent such as benzene or water or may be carried out in the absence of a diluent. As initiator for the polymerization there may be employed molecular oxygen or a peroxygen compound, such as tertiary butyl peroxide, lauryl peroxide, benzoyl peroxide and other acyl peroxides, alkyl and aryl hydroperoxide, and dialkyl and diaryl peroxides. Azonitriles such as azo-diisobutyronitrile or azo-dicyclohexanecarbonitrile, may also be employed. The polymerization may be carried out in a continuous manner in long tubular type of reactors where the polymerization time varies from 2 to 6 min. or in autoclave type of reactors, requiring polymerization times of 20 to 60 sec.

The molecular weight of the copolymer and the molecular structure of the copolymer can be partially controlled by the process conditions employed. Thus, an increase in reaction temperature will lead to a more highly branched product, i.e., a product having a lower density; an increase in temperature will also result in higher catalytic activity, which causes an increase in the conversion of ethylene as well as a lowering of molecular weight. Increases in pressure will result in higher molecular weights. The type of catalyst and quantity employed will also affect molecular weight conversion. Since the polymerization is exothermic in nature, inherent reaction temperature control is at times necessary to slow the reaction rate in order to maintain temperature without affecting other process conditions; this can be done by the addition of certain compounds which have a telogenic effect such as propane, cyclohexane, saturated esters, aldehydes and similar compounds which have been described in the literature. The comonomers employed in the present invention also act as telogens when employed in larger quantities. The comonomer concentration in the copolymer is controlled by the quantity of monomer added to the reaction zone. Under most conditions it was found that the vinyl acetate or similar vinyl esters were converted to polymer to the extent of 15 to 90% per pass. However, the conversion of vinyl acetate or similar vinyl ester to polymer decreases at higher concentrations causing increased telogenic activity of the comonomer in the reaction system and decreased molecular weight in the copolymer. Since it is preferred to maintain the conversion of ethylene to polymer in general in the range of 6 to 15%, the quantity of vinyl acetate charged is in general from 0.05 to 2 mol percent of the ethylene charged.

In practice, the process is carried out by compressing purified ethylene to a pressure intermediate to the reactor pressure, preheating it to a temperature of about 40 to 60° C., and combining with the ethylene feed the comonomer and telogen, when such is employed, as well as polymerization media, such as benzene and water. The catalyst may be combined with the ethylene prior to polymerization, i.e., added to the ethylene feed or may be separately injected into the reaction zone. When separately injected into the reactor system, the catalyst is generally dispersed or dissolved in an inert solvent. The ethylene feed and catalyst are injected into the reaction zone, either an autoclave or a tubular reactor, maintained at high pressure and temperature. The reaction mixture from the reactor containing polymer, unconverted ethylene and other ingredients is passed through a pressure let-down valve into product separators where, due to the reduction of pressure, the gaseous products are separated from the liquid and solid products and from there through a pressure let-down valve into a second product separator where at still lower pressures the solid polymer is separated from the liquid products. The solid polymer is conveyed to an extruder where it is extruded into a commercially suitable shape.

The process of the present invention is further illustrated by the following examples.

EXAMPLES I–XII

Ethylene was copolymerized in a .525 ft. stainless steel autoclave, in accordance with the conditions set forth in Table I. The ethylene was compressed to a pressure of 2300 p.s.i.g. and heated to a temperature of 60° C. prior to injection into the reactor. Propane was used as a telogen at conditions necessitating control of the reaction. Both telogen and comonomer were injected into the ethylene feed stream. The initiator employed was tertiary butyl perisobutyrate, which was injected into the reactor as a 5.7% solution in a benzene-cyclohexane mixture. The resulting reaction mixture was passed through a pressure let-down valve into a high pressure product separator maintained at a temperature of 206° C. and a pressure of 3000 p.s.i.g. where the unreacted ethylene was removed from the polymeric product. The ethylene on purification was recycled. The liquid and solid products were passed into a second low pressure product separator maintained at a pressure of 20 p.s.i.g. and a temperature of 194° C. The liquid products were flashed off and the remaining molten polymer was passed into a 6 inch screw extruder which extruded the polymer into bead form at the temperature indicated. The beads were cut up into cubes.

*Table I.—Synthesis—Conditions*

| Example | Comonomer type | Comonomer feed concentration, mol percent of ethylene | Reactor pressure, p.s.i.g. | Reactor temperature °C. | Extruder temperature °C. | Ethylene flow p.p.h. | Initiator lb./1,000 lb. of resin | Propane, mol percent of ethylene | Comonomer concentration effluent, mol percent of ethylene |
|---|---|---|---|---|---|---|---|---|---|
| I | Vinyl acetate | 0.3 | 22,000 | 185 | 170 | 1,590 | 0.2 | 7.2 | |
| II | do | 0.3 | 22,000 | 186 | 177 | 1,160 | 0.2 | 8.0 | |
| III | do | 0.1 | 22,000 | 215 | 195 | 1,570 | 0.2 | 5.1 | |
| IV | do | 0.04 | 22,000 | 241 | 180 | 1,200 | 0.1 | 2.2 | |
| V | | | 22,000 | 187 | 170 | 1,185 | 0.2 | 8.5 | |
| VI | | | 22,000 | 213 | 197 | 1,570 | 0.2 | 6.0 | |
| VII | | | 22,000 | 241 | 168 | 1,855 | 0.3 | 2.4 | |
| VIII | Butene-1 | 1.17 | 22,000 | 187 | 180 | 1,201 | 0.5 | | 1.1 |
| IX | Cyclohexene | 0.13 | 22,000 | 215 | 150 | 1,043 | 1.4 | | 0.1 |
| X | Diisobutylene | 0.39 | 22,000 | 215 | 150 | 1,170 | 0.4 | 2.4 | 0.28 |
| XI | Methyl methacrylate | 0.21 | 22,000 | 215 | 200 | 1,200 | 0.5 | 3.5 | 0 0. |
| XII | Styrene | 0.13 | 22,000 | 215 | 168 | 1,160 | 1.1 | 4.1 | 0.0 |

The polymers obtained from the above-identified polymerization were then examined as to their basic physical properties and structural characteristics.

The properties listed in Table III were obtained on extruded film. Test methods are indicated. The film properties of the copolymers are compared to those obtained with standard polyethylene film made at substantially identical conditions and tested by identical methods under the heading of "improvement" showing the percentage improvement over the unmodified homopolymer prepared at those conditions.

*Table II.—Copolymer Properties*

| Example | Copolymer type | Concentration, mol percent | Melt index, ASTM 1238-52 T | Density, g./cc. | Infrared characteristics, methyls/100° C. at 7.25 μ [1] | Yield strength, p.s.i.[2] |
|---|---|---|---|---|---|---|
| I | Vinyl acetate | 0.9 | 2.2 | 0.929 | 1.86 | 1,700 |
| II | ___do___ | 0.9 | 3.4 | 0.929 | 2.10 | 1,770 |
| III | ___do___ | 0.7 | 2.3 | 0.925 | 2.16 | 1,590 |
| IV | ___do___ | 0.25 | 2.2 | 0.921 | 2.00 | 1,410 |
| V | | | 2.1 | 0.928 | 0.75 | 2,010 |
| VI | | | 1.8 | 0.925 | 1.46 | 1,820 |
| VII | | | 2.7 | 0.918 | 2.47 | 1,510 |
| VIII | Butene-1 | 1.1 | 2.2 | 0.927 | 1.15 | |
| IX | Cyclohexene | 0.36 | 7.1 | 0.926 | | 1,740 |
| X | Diisobutylene | 0.28 | 1.6 | 0.923 | | 1,630 |
| XI | Methyl methacrylate | 1.9 | 2.0 | 0.926 | | |
| XII | Styrene | 1.2 | 1.7 | 0.924 | 1.44 | 1,580 |

[1] Small effect of main chain ends not taken into consideration.
[2] ASTM-D-412-41 at 20 in./min.

The resulting copolymers were melt extruded into thin film using the blown film technique described in U.S. Patent 2,461,975, which issued to Edward D. Fuller on February 15, 1949. The following conditions were employed:

*Table III.—Properties of Blown Film*

| Example | Copolymer type | Comonomer concentration | Transparency [1] | | Haze [2] | | Gloss [3] | |
|---|---|---|---|---|---|---|---|---|
| | | | In percent | Improvement | In percent | Improvement | Per mil | Improvement |
| I | Vinyl acetate | 0.9 | 47 | +12 | 4.6 | +27 | 81 | +33 |
| II | ___do___ | 0.9 | 53 | +26 | 5.2 | +17 | 81 | +33 |
| III | ___do___ | 0.7 | 27 | +4 | 5.0 | +31 | 75 | +17 |
| IV | ___do___ | 0.25 | 15 | | 7.3 | | 36 | |
| V | | | 42 | | 6.3 | | 61 | |
| VI | | | 26 | | 6.4 | | 64 | |
| VII | | | | | 7.2 | | 37 | |
| VIII | Butene-1 | 1.1 | 36 | −14 | 6.4 | 0 | 57 | −6 |
| IX | Cyclohexene | 0.36 | 47 | +12 | 8.6 | −34 | 47 | −27 |
| X | Diisobutylene | 0.36 | 9 | −79 | 14 | −118 | 15 | −77 |
| XI | Methyl methacrylate | 1.9 | 4 | −90 | 11.1 | −73 | 21 | −67 |
| XII | Styrene | 1.2 | 5 | −88 | 23.1 | −360 | 7 | −89 |

[1] Test Method: Gardener Scattermaster
[2] Test Method: ASTM D-1003-52
[3] Test Method: ASTM D-523-53T Extruder type _____ 1½ in. modern plastics.
Screw _____ Constant pitch, constant depth.
Screw speed _____ 80 r.p.m.
Barrel temperatures:
　Back _____ 115° C.
　Front _____ 153° C.
Temperature of polymer melt __ 160° C.
Die:
　Opening _____ 0.020 in.
　Diameter _____ 4 in.
　Temperature _____ 160–164° C.
Film thickness _____ 1.25 mil.
Air pressure:
　Within tube _____ 0.08 in. of water.
　Cooling ring _____ 4 in. of water.
Air temperature _____ 31° C.
Take-up speed _____ 23 ft./min.

EXAMPLES XIII TO XVI

Following the polymerization and fabrication procedure of the preceding examples, four polymerizations with various amounts of vinyl acetate were carried out at 22,000 p.s.i.g. The data relating to synthesis conditions, product properties and blown film properties are listed in Table IV. As can be seen from the data, optimum improvement in optical properties of film prepared from the copolymer is obtained at a vinyl acetate concentration of 3 mol percent. At a concentration of 5 mol percent, the improvement in optical properties is lost. Taking into consideration the decrease in tensile properties resulting from the addition of vinyl acetate, it is apparent that the maximum improvement is obtained at a vinyl acetate concentration of 0.5 to 3 mol percent in the polymer.

The examples have illustrated the improved compositions obtained with the copolymers of the present invention. As shown by the data, the vinyl acetate copolymers have improved optical properties when extruded into film, as compared to the ethylene homopolymer and as compared to a large number of other copolymers. The data further shows that the amount of the vinyl comonomer introduced into the copolymer is critical. Within Table IV

| Example | Synthesis conditions ||||| Polymer properties |||| Blown film properties |||
|---|---|---|---|---|---|---|---|---|---|---|---|---|
| | Ethylene feed rate p.p.k. | Vinyl acetate feed rate in mol percent of ethylene | Telogen (propane) feed rate in percent of ethylene | Reaction temperature | Initiator, lb/1,000 lbs. | Polymer melt index | Vinyl acetate in resin, mol percent | Tensile Yield Point p.s.i. | Density g./cc. | Transparency in percent | Haze in percent | Gloss/mil |
| XIII | 1,240 | | 7.1 | 187 | 0.32 | 2.4 | 0 | 1,990 | 0.927 | 38 | 6.5 | 63 |
| XIV | 1,330 | 0.83 | 4.4 | 187 | 0.35 | 2.3 | 2.0 | 1,230 | 0.930 | 51 | 3.2 | 91 |
| XV | 1,380 | 1.9 | 2.6 | 187 | 0.32 | 1.8 | 3.0 | 750 | 0.932 | 40 | 2.1 | >98 |
| XVI | 1,410 | 5.6 | 1.0 | 187 | 0.19 | 1.8 | 5.3 | 700 | 0.933 | 17 | 3.8 | 63 | the critical range, the copolymers have not only improved optical properties when extruded into film, but substantially retain the outstanding mechanical and structural properties of polyethylene, and also retain the fabricability and processability of polyethylene.

The copolymers of the present invention are useful for all applications that homopolymers of ethylene can be employed for, but are particularly useful in the preparation of packaging film.

I claim:
1. A telomeric copolymer of ethylene and vinyl acetate containing propane incorporated into the polymer as telogen, the concentration of propane being 2.2 to 8 mol percent of ethylene monomer and from 0.5 to 3 mol percent of vinyl acetate in the copolymer, having a density of 0.915 to 0.940 g./cc. and a melt index of 0.1 to 20.

2. The copolymer set forth in claim 1 in film form.

3. Process for preparing copolymers of ethylene which comprises passing ethylene, 2.2 to 8.0 mol percent of propane, based on the ethylene charged, and 0.1 to 2.0 mol percent of vinyl acetate, based on the ethylene charged, into a reaction zone maintained at a temperature of 150° to 250° C. at a pressure of 15,000 to 25,000 p.s.i. with catalytic amounts of a free radical forming initiator, continuing the resulting polymerization until a conversion of greater than 6 percent of the ethylene is obtained, and recovering a copolymer of ethylene and vinyl acetate from the resulting mixture, said copolymer containing from 0.5 to 3 mol percent of vinyl acetate, based on the total composition, and having a density of 0.915 to 0.940 g./cc. and a melt index of 0.1 to 20.

4. The process set forth in claim 3 wherein the free radical initiator is a peroxide.

5. The process set forth in claim 4 wherein the peroxide is tertiary-butyl perisobutyrate.

6. The process as set forth in claim 4 wherein the temperature is maintained at 185 to 240° C.

References Cited in the file of this patent

UNITED STATES PATENTS

| 2,436,256 | Hanford | Feb. 17, 1948 |
| 2,703,794 | Roedel | Mar. 8, 1955 |

FOREIGN PATENTS

| 569,927 | Great Britain | June 14, 1943 |

UNITED STATES PATENT OFFICE
CERTIFICATE OF CORRECTION

Patent No. 3,029,230 April 10, 1962

Howard William Strauss

It is hereby certified that error appears in the above numbered patent requiring correction and that the said Letters Patent should read as corrected below.

Columns 7 and 8, Table IV, heading to column 5 thereof, after "temperature" insert -- , °C. --; same table, column 12, line 4 thereof, for "3.8" read -- 2.8 --.

Signed and sealed this 24th day of July 1962.

(SEAL)
Attest:

ERNEST W. SWIDER
Attesting Officer

DAVID L. LADD
Commissioner of Patents